(12) United States Patent
Simkulak et al.

(10) Patent No.: US 8,858,183 B2
(45) Date of Patent: Oct. 14, 2014

(54) ROTOR BLADE FOR A ROTARY-WING AIRCRAFT

(75) Inventors: Richard Joseph Simkulak, Meriden, CT (US); Kevin P. Leahy, Naugatuck, CT (US); Frank Caputo, Cheshire, CT (US); Daniel Ciesielski, Mukilteo, WA (US)

(73) Assignee: Sikorsky Aircraft Corporation, Stratford, CT (US)

( * ) Notice: Subject to any disclaimer, the term of this patent is extended or adjusted under 35 U.S.C. 154(b) by 725 days.

(21) Appl. No.: 12/959,959

(22) Filed: Dec. 3, 2010

(65) Prior Publication Data

US 2011/0211968 A1    Sep. 1, 2011

Related U.S. Application Data

(60) Provisional application No. 61/308,537, filed on Feb. 26, 2010.

(51) Int. Cl.
*B64C 27/473* (2006.01)
*B64C 27/46* (2006.01)

(52) U.S. Cl.
CPC ....... *B64C 27/463* (2013.01); *B64C 2027/4736* (2013.01); *B64C 27/473* (2013.01)
USPC .................. 416/226; 29/889.7; 29/889.71

(58) Field of Classification Search
USPC .............................. 416/226; 29/889.7, 889.71
See application file for complete search history.

(56) References Cited

U.S. PATENT DOCUMENTS

| 3,721,507 | A | * | 3/1973 | Monteleone | 416/223 R |
|---|---|---|---|---|---|
| 4,022,546 | A | * | 5/1977 | Drees et al. | 416/226 |
| 4,083,656 | A | * | 4/1978 | Braswell et al. | 416/226 |
| 4,120,610 | A | * | 10/1978 | Braswell et al. | 416/226 |
| 4,304,376 | A | * | 12/1981 | Hilton | 244/123.6 |
| 4,324,530 | A | * | 4/1982 | Fradenburgh et al. | 416/228 |
| 5,248,242 | A | * | 9/1993 | Lallo et al. | 416/226 |
| 5,269,658 | A | * | 12/1993 | Carlson et al. | 416/229 R |
| 5,320,494 | A | * | 6/1994 | Reinfelder et al. | 416/226 |
| 5,346,367 | A | * | 9/1994 | Doolin et al. | 416/230 |
| 5,476,704 | A | * | 12/1995 | Kohler | 428/119 |
| 6,976,829 | B2 | * | 12/2005 | Kovalsky et al. | 416/226 |
| 7,246,998 | B2 | * | 7/2007 | Kovalsky et al. | 416/87 |
| 7,758,312 | B2 | * | 7/2010 | Leahy et al. | 416/224 |
| 7,762,785 | B2 | * | 7/2010 | Leahy et al. | 416/226 |
| 7,771,173 | B2 | * | 8/2010 | Leahy et al. | 416/224 |
| 2007/0251090 | A1 | * | 11/2007 | Breugel et al. | 29/889.7 |
| 2009/0148301 | A1 | | 6/2009 | Leahy et al. | |
| 2009/0148302 | A1 | | 6/2009 | Leahy et al. | |
| 2009/0148303 | A1 | | 6/2009 | Leahy et al. | |
| 2009/0269205 | A1 | | 10/2009 | Leahy et al. | |
| 2010/0008788 | A1 | * | 1/2010 | Barbee et al. | 416/224 |

\* cited by examiner

*Primary Examiner* — Edward Look
*Assistant Examiner* — Christopher R Legendre
(74) *Attorney, Agent, or Firm* — Cantor Colburn LLP

(57) ABSTRACT

A rotor blade for a rotary-wing aircraft includes a core member having a first end that extends to a second end, and a spar member positioned about the core member. The spar member includes a first end section that extends to a second end section. A tip core assembly is mounted at the second end section of the spar member. The tip core assembly is formed from a honeycombed material. The rotor blade also includes a rotor blade skin mounted about the spar member and the tip core assembly.

15 Claims, 6 Drawing Sheets

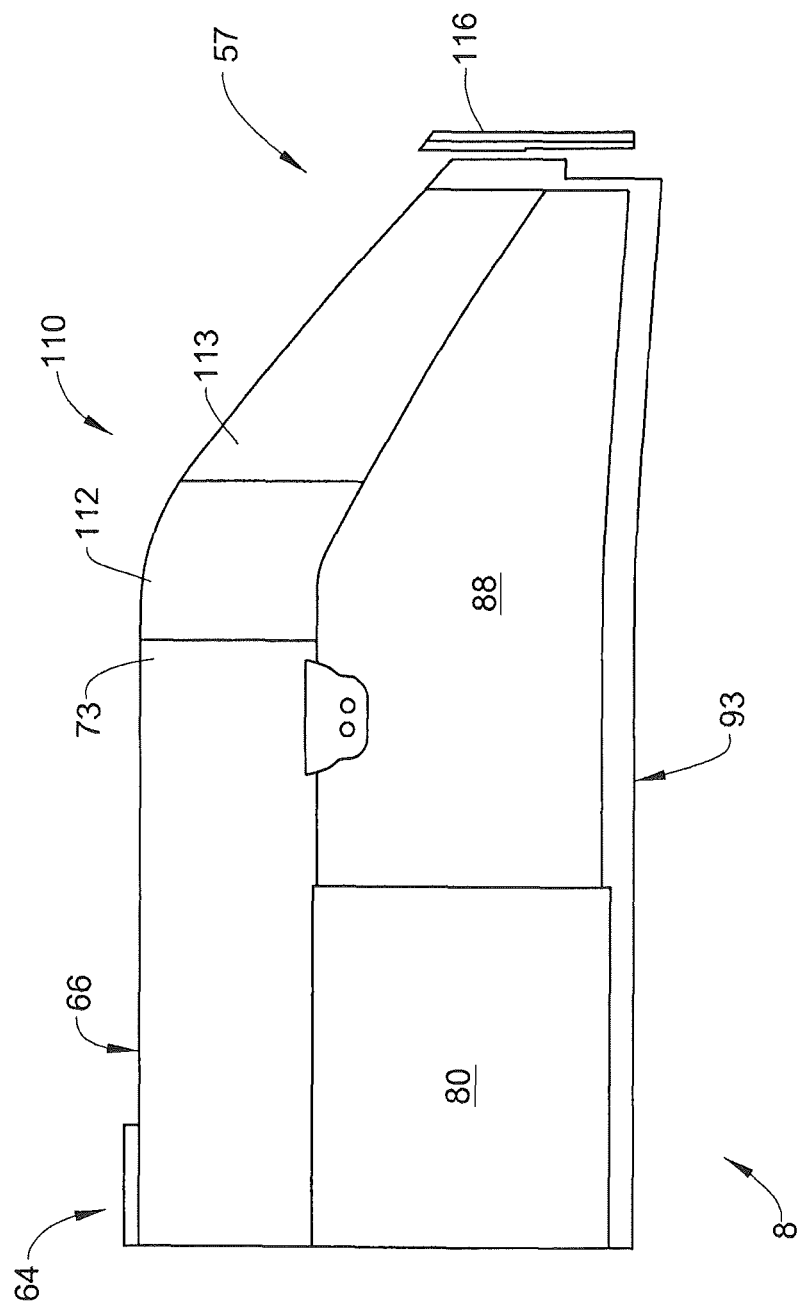

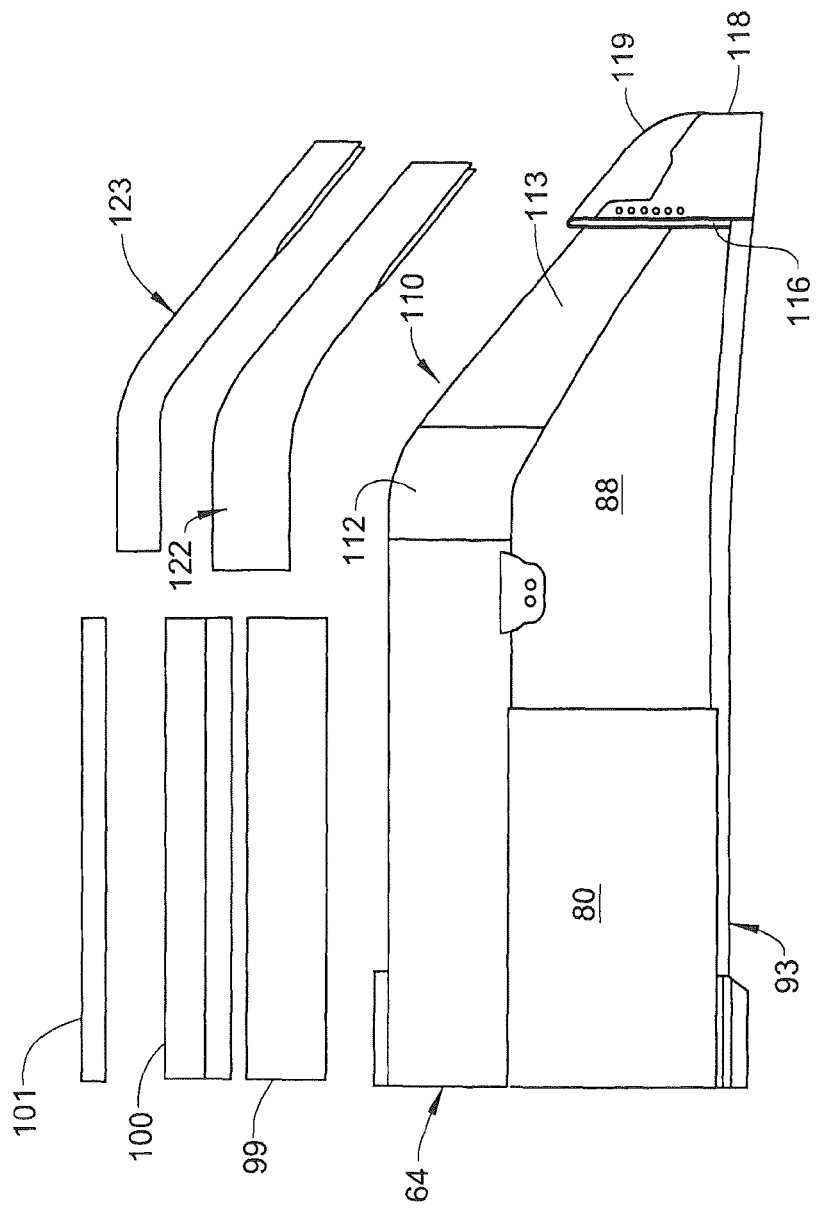

ROTOR BLADE FOR A ROTARY-WING AIRCRAFT

CROSS REFERENCE TO RELATED APPLICATIONS

This application claims the benefit of U.S. Provisional Application No. 61/308,537 filed on Feb. 26, 2010 and which is incorporated by reference herein in its entirety.

FEDERAL RESEARCH STATEMENT

This invention was made with government support with the United States Navy under Contract No. N00019-06-C-0081. The government has certain rights in this invention.

BACKGROUND OF THE INVENTION

The subject matter disclosed herein relates to the art of rotary-wing aircraft and, more particularly, to a rotor blade assembly for a rotary-wing aircraft.

Rotary-wing aircraft include a plurality of rotor blades that are coupled to a central hub. The rotor blades include aerodynamic surfaces that, when rotated, create lift. Many conventional rotor blades include an anhedral tip section having a particular sweep, taper, and/or form to enhance rotor blade performance. Anhedral tip sections increase hover performance and lift capabilities of the rotary-wing aircraft. Rotor blade tip sections are subjected to high stresses and strains resulting from aerodynamic forces developed during operation. The enhanced performance provided by anhedral tip sections leads to greater tip stress and strain caused by the aerodynamic forces. Conventional anhedral tip sections require numerous components to carry the loads developed by the aerodynamic forces. The need for the numerous components increases manufacturing complexity, difficulty and cost.

BRIEF DESCRIPTION OF THE INVENTION

According to one aspect of the invention, a rotor blade for a rotary-wing aircraft includes a core member having a first end that extends to a second end, and a spar member positioned about the core member. The spar member includes a first end section that extends to a second end section. A tip core assembly is mounted to the second end section of the spar member. The tip core assembly is formed from a honeycombed material. The rotor blade also includes a rotor blade skin mounted about the spar member and the tip core assembly.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 5 is a partial plan view of the tip assembly of FIG. 4; and

FIG. 6 is partial plan view of the tip assembly of FIG. 5 illustrating additional rotor blade components.

The detailed description explains embodiments of the invention, together with advantages and features, by way of example with reference to the drawings.

DETAILED DESCRIPTION OF THE INVENTION

Figure 1:
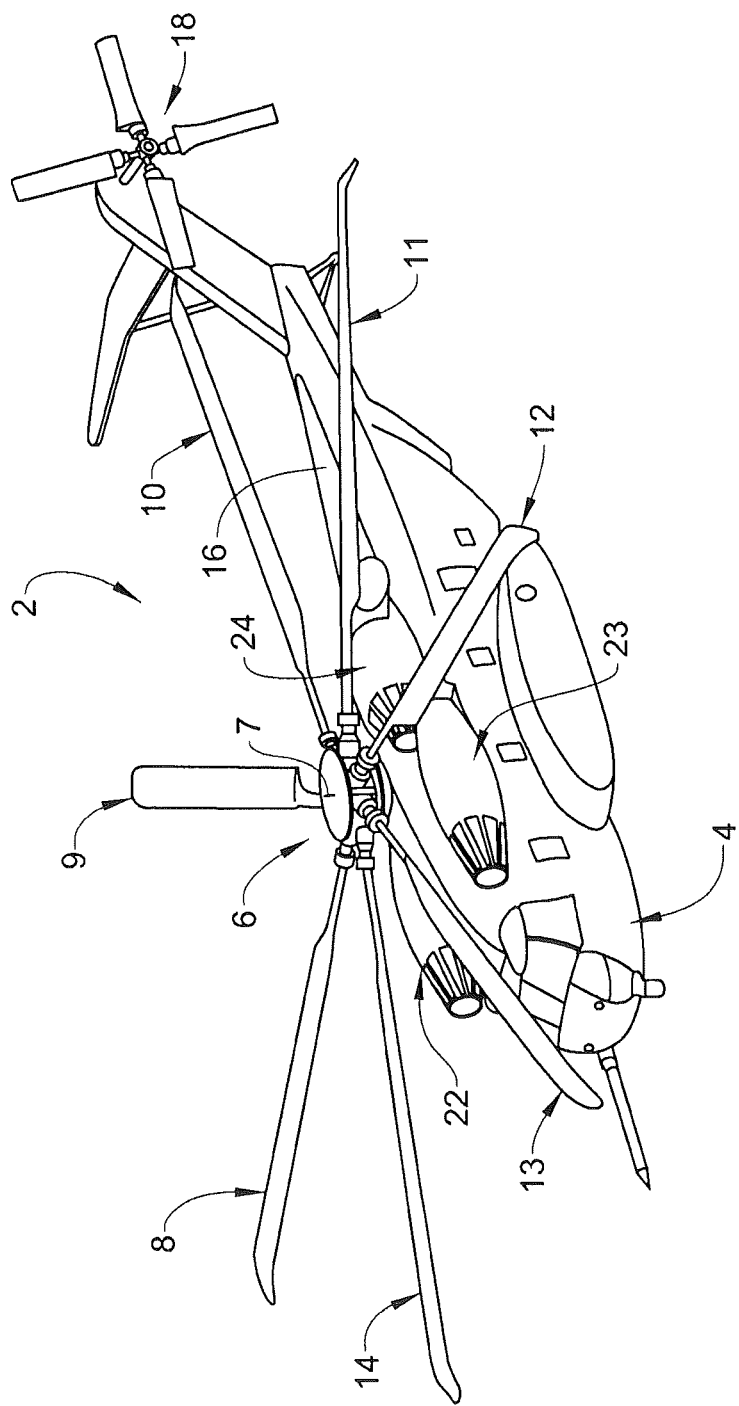
FIG. 1 is a perspective view of a rotary-wing aircraft including a plurality of rotor blades constructed in accordance with an exemplary embodiment.

With reference to FIG. 1, a rotary-wing aircraft constructed in accordance with an exemplary embodiment is indicated generally at 2. Rotary-wing aircraft 2 includes an airframe 4 that supports a main rotor system 6 having a hub 7 and a plurality of rotor blade assemblies 8-14. Airframe 4 is also shown to include a tail section 16 having a tail rotor system 18. Main rotor system 6 and tail rotor system 18 are driven by a plurality of engines 22-24 mounted to airframe 4. Although a particular configuration of a rotary-wing aircraft is illustrated and described in the disclosed non-limiting embodiment, other configurations and/or machines, such as high speed compound rotary-wing aircraft with supplemental transitional thrust systems, dual counter-rotating, coaxial rotor system aircraft, turbo-props, tilt-rotors and tilt-wing aircraft will also benefit from the described exemplary embodiments.

Figure 2:
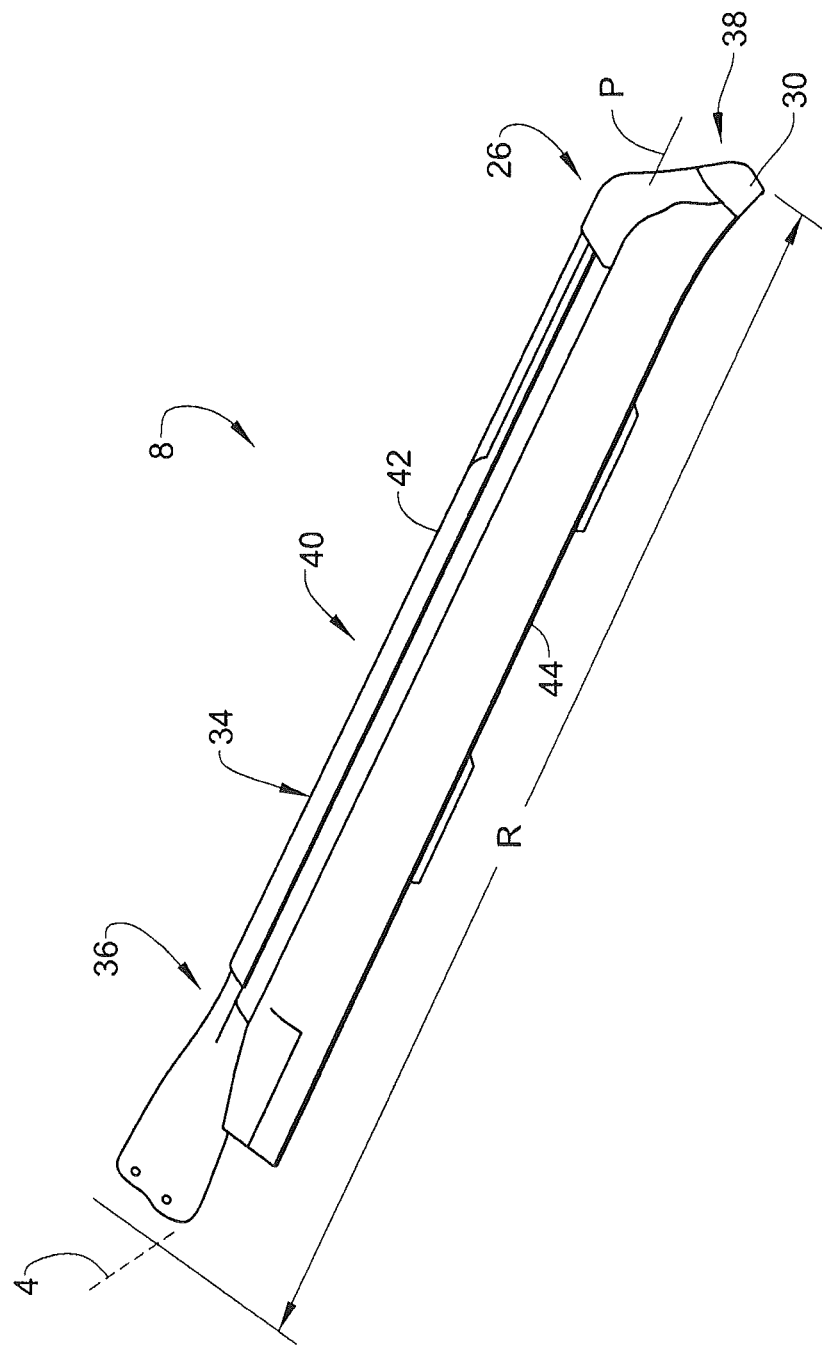
FIG. 2 is a perspective view of one of the plurality of rotor blades of FIG. 1.

At this point, reference will follow to FIG. 2 in describing rotor blade assembly 8 with an understanding that the remaining rotor blade assemblies 9-14 include similar structure. Rotor blade assembly 8 includes a body 34 having a root section 36 that extends to a tip section 38 through an intermediate section 40. Intermediate section 40 includes a leading edge 42 as well as a trailing edge 44. As will be discussed more fully below, tip section 38 includes an anhedral form (not separately labeled) however, any angled and non-angled forms such as cathedral, gull, bent, and other non-straight form will benefit from the described exemplary embodiments.

Figure 3:
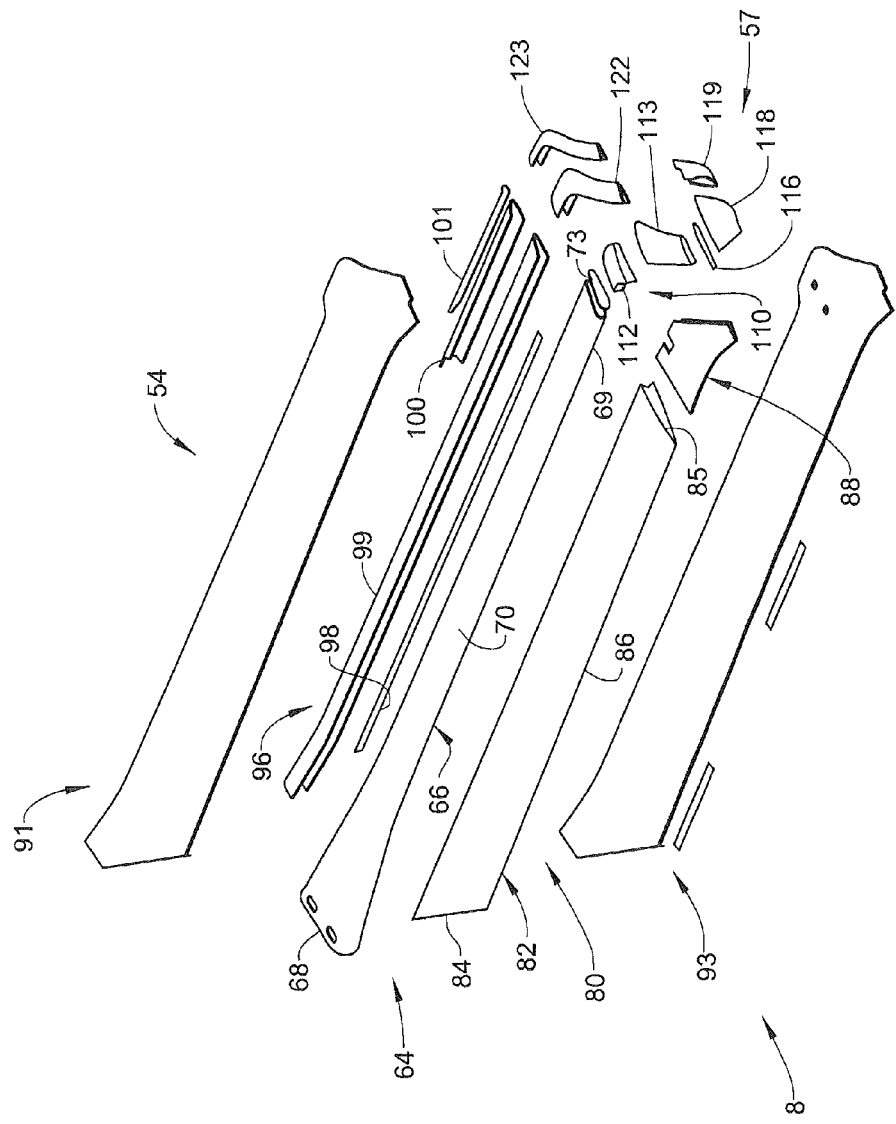
FIG. 3 is an exploded view of the rotor blade of FIG. 2.

Referencing FIG. 3, rotor blade assembly 8 includes a main blade assembly 54 and a tip assembly 57. Main blade assembly 54 includes a spar member 64 having a body section 66 including a first end section 68 that extends to a second end section 69 through an intermediate section 70. Spar member 64 is shown to include a spar closeout 73 positioned at second end section 69. A core member 80 is arranged about spar member 64. Core member includes a body member 82 having a first end 84 that extends to a second end 85 through an intermediate portion 86. A tip core section 88 is positioned at second end 85 of core member 80. A first or upper skin 91 and a second or lower skin 93 are mounted to both spar member 64, and to core member 80, and tip core sections 88 and 110.

Main blade assembly 54 is also shown to include a leading edge assembly 96. Leading edge assembly 96 includes a leading edge counter weight 98, a leading edge sheath 99, a first metallic erosion strip 100 and a second metallic erosion strip 101. First metallic erosion strip 100 and second metallic erosion strip 101 provide abrasion protection to rotor blade assembly 8. It should be understood that a variety of wear-resistant material may be utilized for leading edge assembly 96.

Figure 4:
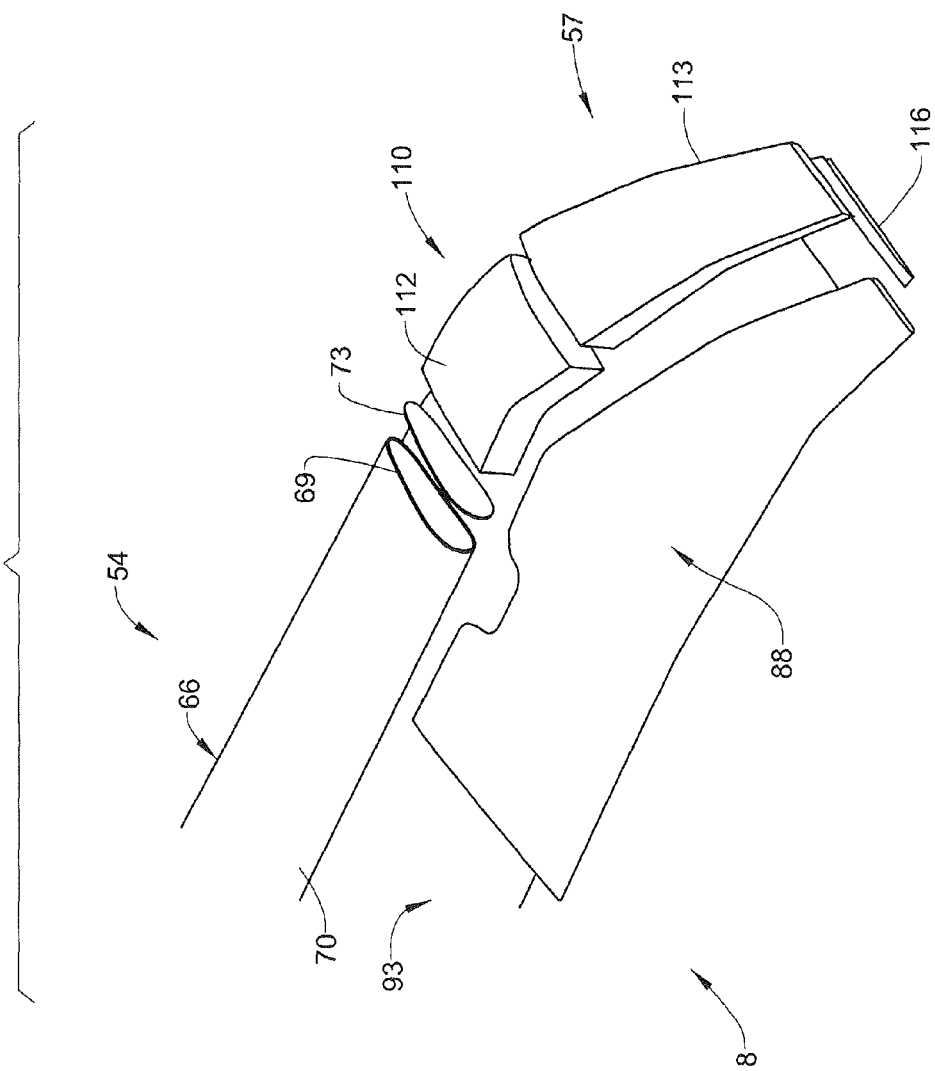
FIG. 4 is a detailed view of a tip assembly of the rotor blade of FIG. 3.

Tip assembly 57 includes a tip core assembly 110 having a first tip core element 112 and a second tip core element 113. In accordance with the exemplary embodiment, first and second tip core elements 112 and 113 are formed from a high density honeycombed material. First tip core element 112 is operatively coupled to second end section 69 of spar member 64. More specifically, first tip core element 112 is operatively coupled to spar closeout 73. Second tip core element 113 is operatively connected to first tip core element 112 forming an anhedral form for tip assembly 57 such as shown in FIG. 4-6. As shown, in addition to being mounted to spar member 64, core member 80 and tip core section 88, upper skin and lower skins 91 and 93 are mounted to first tip core element 112 and second tip core element 113. In any event, tip core assembly 110 also includes a tip core closeout 116, a tip cap 118 and a nickel tip cap 119 that provide abrasion resistance to blade assembly 54.

In the exemplary embodiment shown, tip assembly 57 includes a laminate splice cap 122 that extends across an interface (not separately labeled) between tip core assembly 110, upper and lower skins 91 and 93, and spar member 64. Laminate splice cap 122 provides additional structural rigidity to tip assembly 57. In addition to laminate splice cap 122, tip assembly 57 includes a nickel splice cap 123. Nickel splice cap 123 is operatively connected to laminate splice cap 122 to provide additional corrosion resistance. First and second skins 91 and 93 are added to complete rotor blade assembly 8. First and second skins 91 and 93 extend continuously from root section 36 to tip section 38. With this arrangement, tip core assembly 110 is readily employed to define the anhedral form for tip assembly 57 while, at the same time, minimizing manufacture cost, complexity and risk. That is, by forming tip core assembly 110 in the manner described above, the likelihood of delamination or other manufacturing failures that would result in significant manufacturing losses is reduced.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A rotor blade for a rotary-wing aircraft, the rotor blade comprising:
   a core member extending from a first end to a second end;
   a spar member connected to the core member, the spar member having a first end section that extends to a second end section, the core member connected with and extending from the spar member between the first and second end sections;
   a tip core assembly mounted at the second end section of the spar member and the second end of the core member, the tip core assembly being formed from a honeycombed material; and
   a rotor blade skin mounted about the spar member and the tip core assembly, wherein the tip core assembly includes a first tip core element and a second tip core element.

2. The rotor blade according to claim 1, wherein the second tip core element defines an anhedral bend portion of the rotor blade.

3. A rotor blade for a rotary-wing aircraft, the rotor blade comprising:
   a core member extending from a first end to a second end;
   a spar member connected to the core member, the spar member extending from a first end section to a second end section, the core member connected with and extending from the spar member between the first and second end sections;
   a tip assembly mounted at the second end section of the spar member and the second end of the core member, the tip assembly including at least one tip core element formed from a honeycombed material, the spar member terminating at the tip assembly; and
   a rotor blade skin mounted about the spar member and the tip assembly.

4. The rotor blade according to claim 3, further comprising: a tip cap operatively connected to the tip assembly.

5. The rotor blade according to claim 3, further comprising: a spar member closeout arranged between the second end section of the spar member and the tip assembly.

6. The rotor blade according to claim 3, further comprising a tip core section arranged at the second end of the core member, the tip assembly being arranged about the tip core section.

7. The rotor blade according to claim 6, wherein the first tip core element is operatively connected to the second end of the spar member.

8. The rotor blade according to claim 6, further comprising: another rotor blade skin arranged about the core member and the tip core section.

9. The rotor blade according to claim 8, wherein the another rotor blade skin extends continuously over the core member and the tip core section.

10. The rotor blade according to claim 3, wherein the rotor blade skin extends uninterrupted over the spar member and the tip assembly.

11. The rotor blade according to claim 3, further comprising: a splice cap covering a portion of the spar member and the tip assembly.

12. A method of assembling a rotor blade for a rotary-wing aircraft, the method comprising:
    attaching a tip assembly including a first tip core element and a second tip core element to an end section of a spar member terminating at the tip assembly; the tip assembly including at least one tip core element formed from a honeycombed material; and
    securing a rotor blade skin to the spar member and the tip assembly.

13. The method of claim 12, wherein attaching the tip assembly includes operatively connecting the first tip core element to the end section of the spar member and operatively connecting the second tip core element to the first tip core element of the tip assembly.

14. The method of claim 13, further comprising: operatively connecting a tip core closeout to the second tip core element.

15. The method of claim 12, further comprising: operatively connecting a tip cap to the tip assembly.

* * * * *